(12) United States Patent
Goel (10) Patent No.: US 9,887,978 B2
(45) Date of Patent: Feb. 6, 2018

(54) SYSTEM AND METHOD FOR CENTRALIZED CONFIGURATION AND AUTHENTICATION

(71) Applicant: Veritas Technologies LLC, Mountain View, CA (US)

(72) Inventor: Vikas Goel, Sunnyvale, CA (US)

(73) Assignee: Veritas Technologies LLC, Mountain View, CA (US)

(*) Notice: Subject to any disclaimer, the term of this patent is extended or adjusted under 35 U.S.C. 154(b) by 231 days.

(21) Appl. No.: 14/747,440

(22) Filed: Jun. 23, 2015

(65) Prior Publication Data

US 2016/0380988 A1    Dec. 29, 2016

(51) Int. Cl.
    *H04L 29/06*    (2006.01)
    *H04W 12/06*    (2009.01)

(52) U.S. Cl.
    CPC ............ *H04L 63/08* (2013.01); *H04L 63/102* (2013.01); *H04L 63/20* (2013.01); *H04W 12/06* (2013.01)

(58) Field of Classification Search
    CPC ....... H04L 63/08; H04L 63/102; H04L 63/20; H04W 12/06
    See application file for complete search history.

(56) References Cited

U.S. PATENT DOCUMENTS

| | | | |
|---|---|---|---|
| 5,764,890 A | 6/1998 | Glasser et al. | |
| 5,784,463 A | 7/1998 | Chen et al. | |
| 6,088,451 A | 7/2000 | He et al. | |
| 6,216,202 B1 | 4/2001 | D'Errico | |
| 6,263,446 B1 | 7/2001 | Kausik et al. | |
| 6,275,892 B1 | 8/2001 | Arnott | |
| 6,314,425 B1 | 11/2001 | Serbinis et al. | |
| 6,324,537 B1 | 11/2001 | Moran | |
| 6,385,729 B1 | 5/2002 | DiGiorgio et al. | |
| 6,453,362 B1 | 9/2002 | Bittinger et al. | |
| 6,574,705 B1 | 6/2003 | Peloquin et al. | |

(Continued)

OTHER PUBLICATIONS

International Search Report and Written Opinion in International Application No. PCT/US2016/038835, dated Sep. 13, 2016, 11 pages.

(Continued)

*Primary Examiner* — Theodore C. Parsons
*Assistant Examiner* — Carlos M De Jesus Lassala
(74) *Attorney, Agent, or Firm* — Rory D. Rankin; Meyertons, Hood, Kivlin, Kowert & Goetzel, P.C.

(57) ABSTRACT

A system and method for efficiently obtaining user configuration information for a given device. Multiple devices are deployed in an environment and may be storage appliances. A directory service and an authentication service may be used to determine whether a login session attempt on a deployed device is successful. An identity and access manager (IAM) is used to for this determination and to communicate with the directory service and the authentication service. A device of the one or more of the deployed devices does not store user configuration information. Responsive to an attempted login by a user, the device mimics the existence of the user and generates a request for directory lookup and authentication for the user which is conveyed to an external device. If a positive response is received in response to the request, the user is permitted to login to the device and a session is created for the user.

15 Claims, 7 Drawing Sheets

(56) References Cited

U.S. PATENT DOCUMENTS

| | | |
|---|---|---|
| 6,587,867 B1 | 7/2003 | Miller et al. |
| 6,594,698 B1 | 7/2003 | Chow et al. |
| 6,606,651 B1 | 8/2003 | Linde |
| 6,615,264 B1 | 9/2003 | Stoltz et al. |
| 6,745,207 B2 | 6/2004 | Reuter et al. |
| 6,856,800 B1 | 2/2005 | Henry et al. |
| 6,944,732 B2 | 9/2005 | Thunquest et al. |
| 7,028,090 B2 | 4/2006 | McBrearty et al. |
| 7,111,324 B2 | 9/2006 | Elteto et al. |
| 7,134,138 B2 | 11/2006 | Scherr |
| 7,191,344 B2 | 3/2007 | Lin et al. |
| 7,191,467 B1 | 3/2007 | Dujari et al. |
| 7,231,526 B2 | 6/2007 | Hon et al. |
| 7,275,259 B2 | 9/2007 | Jamieson et al. |
| 7,328,287 B1 | 2/2008 | Arumugham et al. |
| 7,774,455 B1 | 8/2010 | Tock et al. |
| 8,042,163 B1 | 10/2011 | Karr et al. |
| 8,429,712 B2 * | 4/2013 | Robinson ............... H04L 63/083 380/255 |
| 8,484,711 B1 | 7/2013 | Coletta et al. |
| 2003/0084171 A1 | 5/2003 | de Jong et al. |
| 2003/0084292 A1 | 5/2003 | Pierce et al. |
| 2003/0163725 A1 | 8/2003 | Feuser et al. |
| 2003/0172265 A1 | 9/2003 | Vu et al. |
| 2003/0187883 A1 | 10/2003 | Zelenka et al. |
| 2003/0204743 A1 | 10/2003 | Devadas et al. |
| 2004/0103325 A1 | 5/2004 | Priebatsch |
| 2004/0153451 A1 | 8/2004 | Phillips et al. |
| 2004/0255143 A1 | 12/2004 | Wemyss et al. |
| 2009/0199276 A1 | 8/2009 | Schneider |
| 2012/0246423 A1 * | 9/2012 | Farey ................. G06F 11/2074 711/162 |
| 2014/0215548 A1 | 7/2014 | Subramanya et al. |

OTHER PUBLICATIONS

"pGina User's Guide", Jul. 9, 2013, 5 pages, hftp://pgina.org/docs/v3.1/user.html. [Retrieved Sep. 5, 2016].

Loos, Johan, "How to Logon with Domain Credentials to a Server in a Workgroup", Mar. 14, 2013, 51 pages, Version 1.0, http://www.accessdenied.be/blog/documentation/How%20to%20Logon%20with%20Domain%20Credentials%20to%20a%20Server%20in%20a%20Workgroup.pdf. [Retrieved Sep. 5, 2016].

Futagawa, Jun, "Integrating Network Services of Windows and UNIX for Single Sign-On", Proceedings of the 2004 International Conference on Cyberworlds, Nov. 18, 2004, pp. 323-328, IEEE Computer Society, Washington, D. C., USA.

Final Office Action in U.S. Appl. No. 14/754,361, dated Sep. 21, 2016, 15 pages.

Gibson, et al., "File Server Scaling with Network-Attached Secure Disks", Proceedings of the 1997 ACM Sigmetrics International Conference on Measurement and Modeling of Computer Systems, Jun. 15-18, 1997, 13 pages, ACM, New York, NY, USA.

Gibson, et al., "Filesystems for Network-Attached Secure Disks", CMU-CS-97-118, Jul. 1997, 18 pages.

Gibson, et al., "A Cost-Effective, High Bandwidth Storage Architecture", Proceedings of the 8th International Conference on Architectual Support for Programming Languages and Operating Systems, Oct. 1, 1998, 12 pages, ACM, New York, NY, USA.

Czerwinski, et al., "An Architecture for a Secure Service Discovery Service", Proceedings of the 5th Annual ACM/IEEE International Conference on Mobile Computing and Networking, Aug. 1, 1999, pp. 24-35, ACM, New York, NY, USA.

Sandhu, et al., "Access Control: Principles and Practice", IEEE Computer, Sep. 1994, pp. 40-48.

Clark, Elizabeth, "Fibre Channel SAN Security", Sep. 4, 2002, 5 pages, http://www.networkmagazine.com/shared/article/showArticle.jthml?articleId=8703406. [Retrieved May 17, 2005].

King, Bill, "LUN Masking in a SAN", QLogic Communications, Inc., Oct. 8, 2001, 12 pages.

Goel, Vikas, U.S. Appl. No. 14/754,361, entitled "System and Method for Authentication in a Computing System", filed Jun. 29, 2015, 34 pages.

Non-Final Office Action in U.S. Appl. No. 14/754,361, dated Jun. 15, 2016, 13 pages.

Non-Final Office Action in U.S. Appl. No. 14/754,361, dated Feb. 28, 2017, 13 pages.

Final Office Action in U.S. Appl. No. 14/754,361, dated Jun. 23, 2017, 12 pages.

* cited by examiner

SYSTEM AND METHOD FOR CENTRALIZED CONFIGURATION AND AUTHENTICATION

BACKGROUND OF THE INVENTION

Field of the Invention

This invention relates to the field of secure network communication and, more particularly, to authentication and configuration information for a computing device.

Description of the Related Art

As computer memory storage and data bandwidth increase, so does the amount and complexity of data that business and industry manage each day. Data management operations capable of creating, capturing, storing, distributing, protecting and consuming information become complex as the data size grows. In addition, data management operations, such as operations used in enterprise information management, provide regulatory compliance. Regulatory compliance ensures the accuracy and completeness of data contained in files and reports as well as consistent data across the enterprise. Different types of storage devices are deployed across the enterprise to provide these operations. The storage devices may be used in a data center, a remote or branch office, and virtual environments.

Both enterprise and small business environments may deploy multiple storage devices to provide the above data management operations. In some examples, the storage devices are storage appliances. In addition, the environments may deploy multiple computing devices such as desktop computers, laptops and servers. Such environments typically support multiple users who may login locally and/or remotely to one or more devices. Each of these users generally has configuration information including privileges, permissions and roles. In many cases, this user configuration information may be consistent for a given user across several devices. In most cases, a system administrator manually configures and maintains the user configuration information on each of the corresponding devices. Further, any updates to the user configuration information requires the system administrator to manually replicate the same update on each of the corresponding devices.

Enterprise environments typically utilize a user directory service to manage the identity of authorized users on devices. The user directory service may also manage some or all of the users' configuration information. In order for the devices to use the directory service, the system administrator must separately configure each of the multiple devices in the enterprise environment. Therefore, any updates to the user directory service, such as updates to the user directory server properties, may require the system administrator to manually replicate the same update on each of the corresponding devices. Manual updates performed across the multiple devices may be tedious, time consuming, performed infrequently due to the amount of time required, and provide inconsistent user directory service configuration information and/or user configuration information across the enterprise or small business environment.

In view of the above, improved systems and methods for efficiently obtaining user configuration information for a given device are desired.

SUMMARY OF THE INVENTION

Systems and methods for efficiently obtaining user configuration information for a given device are contemplated. In various embodiments, multiple devices are deployed in an environment, such as a small business environment, large enterprise environment, or otherwise. In some embodiments, the devices may storage appliances. In various embodiments, the storage appliances may be used as working storage systems or backup storage systems. The environment may include a directory service and an authentication service. In some embodiments, each of the directory service and the authentication service is on a separate corresponding server.

Connections between the devices, and between the servers and the devices, may include wireless connections, direct local area network (LAN) connections, wide area network (WAN) connections such as the Internet, routers, transmission control protocol/internet protocol (TCP/IP) hardware and/or software, and so forth. One or more of the servers and the deployed devices may be located locally onsite, remotely at another site or branch office, or accessed through a cloud-based network.

Embodiments are contemplated in which one or more of the deployed devices do not store user configuration information such as user role information, user permissions and privileges information and other user configuration information. In addition, one or more of the deployed devices do not store configuration information for a communication protocol used to communicate with one or more of the directory service and the authentication service. An identity and access manager (IAM) is used to process requests for verifying a given user for a given device when the given user requests a login session on the given device. The IAM may be located on one of the deployed devices, on a same server hosting one of the directory service or the authentication service, or on a separate server or other computing device. Alternatively, the IAM may be a cloud-based application.

In various embodiments, the IAM may use a communication protocol, such as the Lightweight Directory Access Protocol (LDAP), to communicate with one or more of the directory service and the authentication service. A response indicating whether the login session attempt is successful and including user configuration information for a successful determination is sent from the IAM to the corresponding deployed device.

These and other embodiments will be appreciated upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
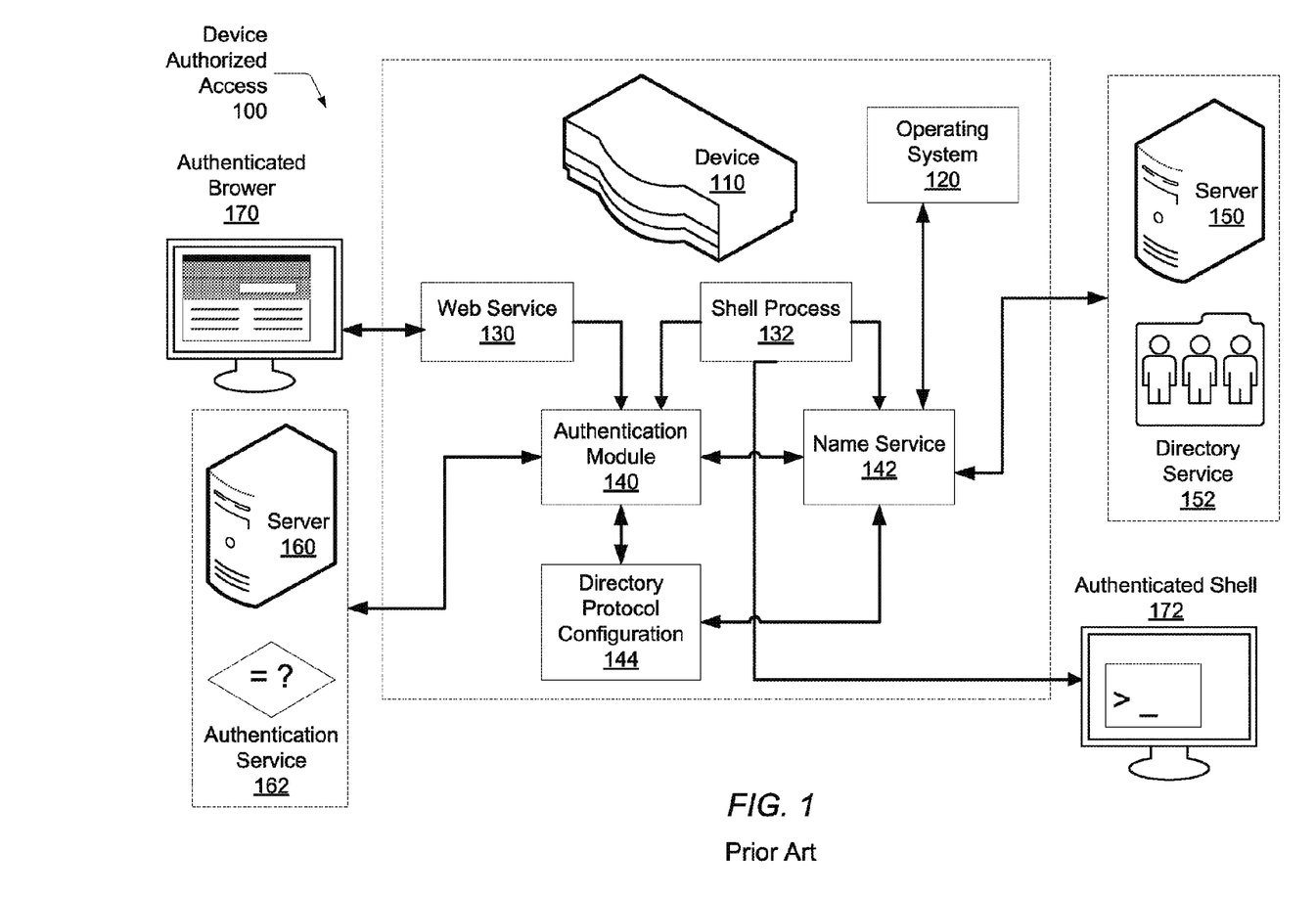
FIG. 1 is a generalized block diagram illustrating one embodiment of device authorized access.

Referring to FIG. 1, a system configured to provide device authorized access 100 according to the prior art is shown. In the example shown, a single device 110 is connected to servers 150 and 160. However, in various other cases, multiple devices are connected to the servers 150 and 160 and connected to one or more other devices. The other multiple devices are not shown for ease of illustration. As shown, the server 150 includes a user directory service 152, which may also be referred to as a directory service 152. The server 160 includes a user authentication service 162, which may also be referred to as an authentication service 162. In some cases, each of the directory service 152 and the authentication service 162 executes on a same server. One or more of the servers 150 and 160 may be a local server. Alternatively, one or more of the servers 150 and 160 may be a remote server. In other cases, one or more of the directory service 152 and the authentication service 162 is a cloud-based application.

In some embodiments, the device 110 is a type of storage, such as a disk storage, a backup server, a Network-Attached Storage (NAS) device, a Storage Area Network (SAN) device, or other. In other embodiments, the device 110 is a purpose-built backup appliance (PBBA). The PBBA may also be referred to as a storage appliance. Typically, storage appliances are a server based on common-used and certified server-hardware sold together with software, wherein the hardware and the software are provided by a single vendor. The storage appliance may include the server, data storage, an operating system, backup software and deduplication software. The all-in-one approach for the storage appliance may lead to relatively quick install (deploy) times. The storage appliance may provide storage, enable storage on another appliance or another storage medium, and/or provide deduplication for both physical systems and virtual systems.

The storage appliances typically provide data storage with capacities between 4 terabytes (TB) and 500 TB. As a result, the storage appliances may replace tape-based backup and recovery processes. In other environments, such as enterprise environments and mainframe environments, the storage appliances may be deployed alongside tape-based systems. The storage appliances may be used for cloud-based storage or on premise storage.

The connections to the servers 150 and 160 may include a variety of techniques including wireless connection, direct local area network (LAN) connections, wide area network (WAN) connections such as the Internet, a router, and others. Connections to the servers 150 and 160 may further include remote direct memory access (RDMA) hardware and/or software, transmission control protocol/internet protocol (TCP/IP) hardware and/or software, router, repeaters, switches, grids, and/or others. As described earlier, each of the device 110 and the servers 150 and 160 may be located onsite or may be cloud-based.

The device 110 includes multiple software components such as at least an operating system (OS) 120, a web service 130, a shell service 132, a pluggable authentication module (PAM) 140, a name service switch (NSS) module 142, and a directory protocol configuration file 144. In alternative embodiments, the modules corresponds to custom designed circuitry to perform the functions described herein. Alternatively, the modules may correspond to a combination of hardware and software. All such embodiments are possible and are contemplated. In various embodiments, NSS module 142 and PAM 140 are specifically configured for use with directory service 152. As such, each of modules PAM 140 and NSS module 142 must have some knowledge of the directory service 152 (e.g., location, protocols, etc.). The OS 120 may be representative of any of a variety of specific operating systems, such as, for example, Symantec Appliance Operating System, Linux, or Sun Solaris. As such, the operating system may be operable to provide a software framework operable to support the execution of various programs such as deduplication, automatic backup, recovery and shell session or web-based browser session creation for authorized users, such as system administrators.

The shell process 132 provides a secure shell (SSH) user interface for accessing services of the OS 120. The shell service 132 provides a command-line interface (CLI) to the services of the OS 120 and other software applications on the device 110. When a user opens a secure shell (SSH) session and successfully logs in as an authorized user, the authenticated shell session 172 is provided to the user. The session 172 may be a CLI providing a manner to repetitively execute a number of tasks in a fixed sequence as a batch job on the device 110. When the batch job utilizes conditional code, scripting may be used with the languages Java, Perl, Python and so forth. The CLI commands may be entered interactively by the user or passed to the CLI in files. The authenticated shell session 172 may be provided on a local monitor onsite with the device 110. Alternatively, the authenticated shell session 172 may be provided on a remote monitor offsite when the user remotely logs in to the device 110.

The web service 130 may be any one of available internet World Wide Web browsers, such as Firefox, Internet Explorer, Google Chrome, and Safari. The web service 130 may be used to provide a graphical user interface (GUI) to the services of the OS 120 and other software applications on the device 110. When a user opens a particular web page and successfully logs in as an authorized user, the authenticated browser session 170 is provided to the user. The authenticated browser session 170 may be provided on a local monitor onsite with the device 110. Alternatively, the authenticated browser session 170 may be provided on a remote monitor offsite when the user remotely logs in to the device 110. The GUI authenticated browser session 170 may provide an easy-to-use interface for the user. As is well known to those skilled in the art, the GUI authenticated browser session 170 may lack sufficient support for efficient automated operation sequences, such as sending batch jobs.

As shown, the directory service 152 executes on the server 150. The directory service 152 allows the sharing of information about users, systems, networks, services, and applications throughout a given network or a given work environment. The directory service 152 may determine the existence of a given user in the work environment. For example, when a user attempts to login to the device 110, a request may be sent to the directory service 152 to verify a username or other identifier associated with the given user. The directory service 152 verifies whether the provided identifier identifies a valid user for the device 110 and sends a corresponding reply to the device 110.

In addition, the directory service 152 may provide user role information to the device 110. The user role information may include a user role, such as a system administrator or a normal user; and privileges and permission for the user. The directory service 152 may provide the user role information during the verification of the existence of the user for the device 110. Alternatively, the directory service 152 may provide the user role information at a later time, such as during a second request after the user has been authenticated by the authentication service 162. Examples of the directory service 152 include Microsoft Active Directory, Linux Network Information Service (NIS), the Apache Directory, and so forth.

As shown, the authentication service 162 executes on the server 160. In other embodiments, the authentication service executes on the server 150 with the directory service 152. In yet other embodiments, the authentication service 162 is integrated with the directory service 152. The authentication service 162 determines whether credentials, such as a password, provided by a given user during a login attempt to the device 110 matches a stored authorized password for the given user.

In some embodiments, a request is sent from the device 110 to the authentication service 162 to authenticate the given user after the existence of the given user on the device 110 is verified. The request to the authentication service 162 may include an encrypted version of the password provided by the given user during the login request to the device 110. The device 110 may use a secure socket layer (SSL) to send the request to the authentication service 162. In some embodiments, a successful verification of authorized access for the given user indicated in a response from the authentication service 162 allows the device 110 to retrieve user role information for the given user and to create a session for the give user. Some server-side Web application frameworks for implementing the authentication service 162 includes Microsoft ASP.NET, Kerberos Authentication Service, SafeNet Authentication Service, and so forth. In addition, the framework Spring Security may be used to provide features in enterprise applications such as the authentication service 162.

Each of the directory service 152 and the authentication service 162 may follow an application protocol for accessing and maintaining distributed directory information services over an Internet Protocol (IP) network. However, the application protocol does not specify how the directory service operates. One example of such a protocol is the Lightweight Directory Access Protocol (LDAP), which is based on a client-server model. An application programming interface (API) for the application protocol, such as LDAP, may simplify the creation of directory service applications.

In order for the device 110 to use each of the directory service 152 and the authentication service 162, both the device 110 and each of the servers 150 and 160 is configured to use the application protocol, such as LDAP. Libraries corresponding to the application protocol may be installed on the servers 150 and 160. One or more of the SSL and Transportation Layer Security (TLS) may be setup for encrypting communication with the servers 150 and 160. The directory protocol configuration file 144 is a configuration file that defines communication protocols for the libraries installed on the servers 150 and 160. In addition, the file 144 defines the location of the servers 150 and 160, a priority of which servers to contact for verification of users, and a communication protocol with at least the servers 150 and 160. In the LDAP example, the file 144 is the ldap.config file.

In various embodiments, the name service switch (NSS) module 142 is configured to enable services to access data (e.g., databases) on one or more servers. The NSS module 142 may organize the services and corresponding databases into groups or modules. For example, the groups may include mail aliases, network protocols, host names, Ethernet numbers, user names, user group names, and so on. For each group, the NSS module 142 may include one or more corresponding databases which may be listed according to priority. A configuration file, such as an nsswitch.conf file, may be used to provide a lookup process for each database. For example, responsive to a given user requesting login to the device 110, the configuration file for the NSS module 142 may indicate the directory service 152 is on server 150. In some embodiments, the NSS module 142 is included in the OS 120.

The NSS module 142 may receive a username from the shell process 132 or the web service 130 during a login request from a given user. The NSS module 142 may determine to access the directory service 152, such as by accessing the configuration file for the NSS module 142, and further determine the server 150 hosts the directory service 152. Therefore, the request to determine whether the given user exists for the device 110 is sent to the directory service 152 on the server 150. The request includes at least the username provided by the given user. The directory service 152 sends a response to the device 110 after determining whether the given user exists for the device 110. In response to receiving an indication indicating the given user exists as a user for the device 110, the pluggable authentication module (PAM) 140 may be notified to determine whether the login request is authorized.

The PAM 140 provides a manner for establishing or verifying that a given user is who they claim to be. The PAM 140 includes a library is a generalized API that includes a library of modules for authentication-related services. The PAM 140 allows a system administrator to add new authentication methods by installing new libraries. A configuration file, such as a pam.conf file, determines which authentication services to select.

When the PAM 140 receives an indication indicating that a given user requesting login to the device 110 exists for the device 110, the PAM 140 determines to access the authentication service 162, such as by accessing the configuration file for the PAM module 140, and further determines the server 160 hosts the authentication service 162. Therefore, the request to determine whether the given user is an authenticated for use of the device 110 is sent to the authentication service 162 on the server 160. The request includes at least an encrypted version of the password provided by the given user. The authentication service 162 sends a response to the device 110 after determining whether the given user is an authenticated user for the device 110. In response to receiving an indication indicating the given user is authorized for the device 110, the device 110 may create a login session for the given user using the stored user role information.

As described earlier, a single device 110 is shown, but multiple devices may use the directory service 152 and the authentication service 162. For example, hundreds of devices may be deployed and configured to use the directory service 152 and the authentication service 162. Updates to the directory protocol configuration file 144 on each of the hundreds of devices may be manually added and maintained by a system administrator. In addition, the user roles, privileges and permissions for a given user may be replicated across the hundreds of devices. Changes to the user roles and/or the servers 150 and 160 hosting the directory service 152 and the authentication service 162 are manually updated across the appropriate devices of the hundreds of devices. The manual maintenance of all of this information may be inefficient and tedious for the system administrator.

In other embodiments, a smaller number of devices, such as a dozen, may use the authentication service 162. The directory service 152 may not be used in such a small business environment. The system administrator may create local users and grants corresponding roles, privileges and permissions on each of the devices. Changes to the user roles and/or the servers 150 and 160 hosting the directory service 152 and the authentication service 162 may still be manually updated across the appropriate devices.

Figure 2:
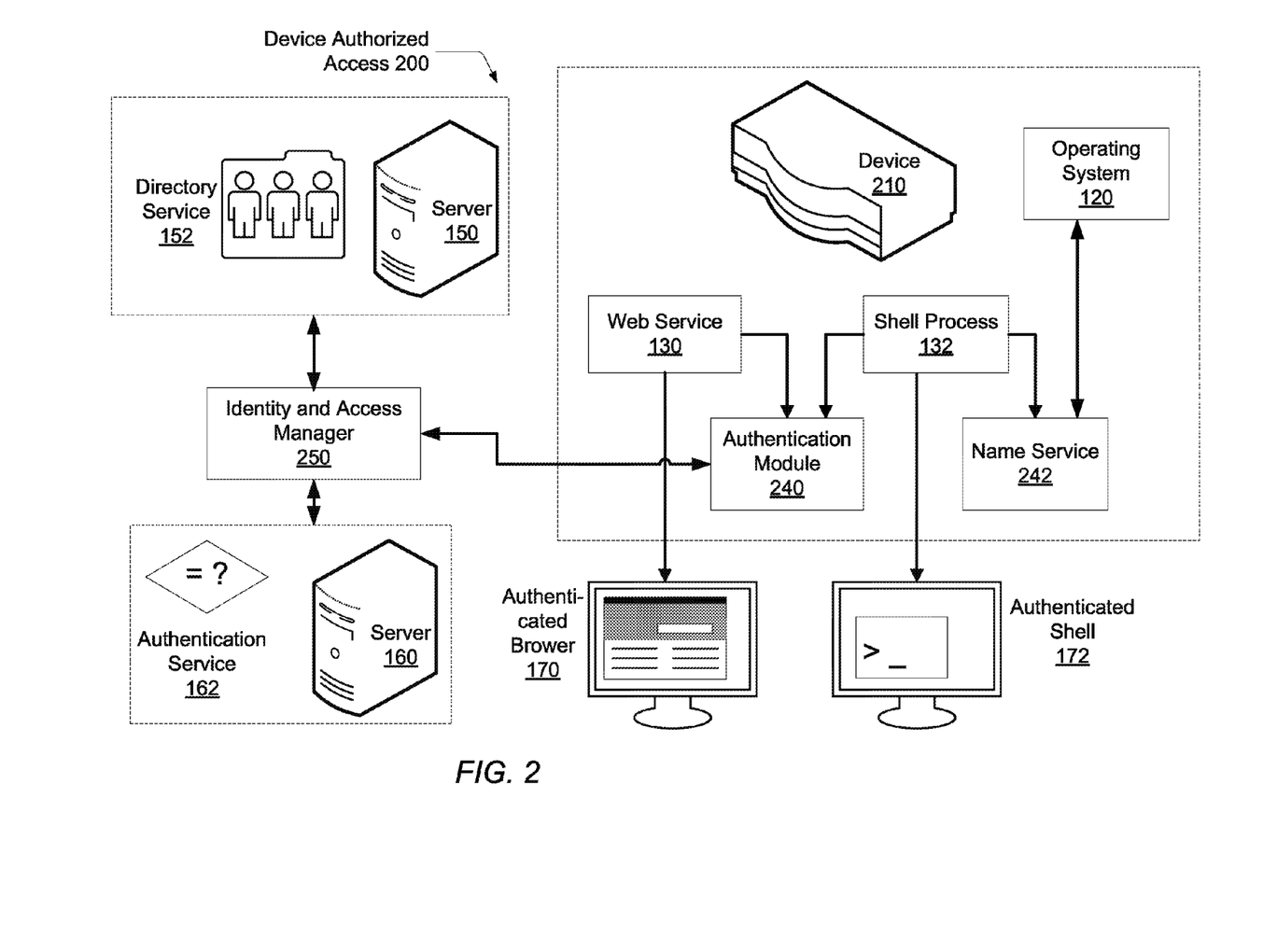
FIG. 2 is a generalized block diagram illustrating another embodiment of device authorized access.

Turning now to FIG. 2, a generalized block diagram of another embodiment of device authorized access 200 is shown. Circuitry and logic described earlier are numbered identically. In various embodiments, the device 210 may be a purpose-built backup appliance (PBBA) similar to the device 110 described earlier. The PBBA may also be referred to as a storage appliance. The device 210 includes the operating system 120, the web service 130, and the shell service 132. Here, the device 210 does not include a directory protocol configuration file 144, such as the ldap.config file. In various embodiments, the device 210 may be unaware of the type of the directory service 152 and the type of the authentication service 162 let alone be aware of a particular type of protocol to use to communicate with the directory service 152 and the authentication service 162. Each of the servers 150 and 160 is still configured to use an application protocol, such as LDAP, but no longer the device 210. Additionally, the device 210 may not store any user configuration data such as user role information. The device 210 may also not store user privileges and permissions information.

As shown, the device 210 includes the name service switch (NSS) 242. Similar to the previous description for the NSS 142, the NSS 242 organizes the services and corresponding databases into groups. For each group, the NSS module 142 may include multiple corresponding databases listed according to priority. A configuration file, such as an nsswitch.conf file, provides a lookup process for each database. Unlike the previous NSS 142, the NSS 242 may not be configured to any particular application protocol for accessing and maintaining distributed directory information services, such as the LDAP protocol.

When the NSS 242 receives an indication from either the web service 130 or the shell service 132 that a given user requests a login session to the device 210, the NSS 242 may create a temporary (virtual) user to mimic the existence of the given user. In various embodiments, mimicking the existence of the given user gives the appearance that the given user was already (previously) configured to use the device. Configuring the user to use a device would generally include storing particulars on the device related to the user. However, in various embodiments, there are no particulars related to the given user stored on the device. In such an embodiment, the device has no knowledge of the user. For all intents and purposes, the device may perceive the login by the given user as an attempted login by a completely unknown individual. In some embodiments there could be traces of a user left on a device after a session (e.g., log files, etc.). However, such traces would not be usable for the purpose of verifying the existence of a configuration for the user on the device.

By creating a virtual user, the device (in effect) "pretends" that the user is known to the device and has previously been configured to use the device. For example, the NSS 242 may create a data structure with multiple fields. The fields may store information such as a user identifier (ID), a group ID, a username, a user home directory, a default shell type, and so forth. A particular field may also indicate whether the user exists for the device 210. Most of these fields are unknown until contact with the directory service 152. However, the NSS 242 may store the username provided by the given user during the login request. In addition, the NSS 242 may store an indication that the given user exists for the device 210 although no communication with the directory service 152 is yet performed and the majority of the fields in the data structure are not filled with valid data.

The NSS 242 may send notification to the PAM 240 that the given user exists for the device 210 although the directory service 152 has not yet been accessed. Similar to the previous description for the PAM 140, the PAM 240 authenticates a user requesting a login to the device 210. A configuration file, such as a pam.conf file, determines which authentication services to select. Unlike the previous PAM 140, the PAM 240 may not be configured to any particular application protocol for accessing and maintaining distributed directory information services, such as the LDAP protocol. In response to the notification from the NSS 242 indicating the given user exists for the device 210 although the directory service 152 has not yet been accessed, the PAM 240 may generate a request or transaction to send to the identity and access manager (IAM) 250. The request may indicate each of the existence for the given user for the device 210 and authentication for the given user is requested. The request, however, may not use any particular application protocol for accessing and maintaining distributed directory information services, such as the LDAP protocol. In contrast to the prior art modules PAM 140 and NSS 142 shown in FIG. 1, modules 240 and 242 of FIG. 2 do not generally have specific knowledge of directory service 152. Rather, each of modules 240 and 242 are more generic than those of the prior art and need not be specifically configured to work with and/or match the directory service 152.

The IAM 250 receives the request from the PAM 240. In various embodiments, the IAM 250 is a cloud-based application. In other embodiments, the IAM 250 executes locally, such as within the PAM 240, as a separate component within the device 210 or within another device (not shown) located onsite. Alternatively, the IAM 250 executes on another device, such as another storage appliance, connected to the device 210 through a direct local area network (LAN) connections, wide area network (WAN) connections such as the Internet, a router, and others. In yet other embodiments, the IAM 250 executes on one of the servers 150 and 160.

When the IAM 250 receives the request from the PAM 240, the IAM 250 may receive at least the username used during the login request from the given user. Similar to the previous description for the previous NSS module 142, the IAM 250 may determine to access the directory service 152, such as by accessing a corresponding configuration file for the IAM 250, and further determine the server 150 hosts the directory service 152. In addition, the IAM 250 determines the type of protocol to use with the directory service 152, such as the LDAP protocol. Each of the PAM 240 and the NSS 242 within the device 210 may be unaware of the type of the protocol, whereas the IAM 250 is both aware of the protocol and uses the protocol to communicate with the directory service 152. In addition, the IAM 250 may use the framework Spring Security during communication with one or more of the directory service 152 and the authentication service 162.

After receiving the request from the IAM 250 including at least the username provided by the given user, the directory service 152 processes the request and returns a response to the IAM 250. The response indicates whether the given user exists for the device 210. The IAM 250 may include a library of modules for authentication-related services. The IAM 250 may allow a system administrator to add new authentication methods by installing new libraries. Additionally, the IAM 250 may allow a system administrator to set up multiple authentication-related services for different devices where selection of a particular service is based on at least a source of an authentication request. Although the single device 210 is shown, multiple devices may communicate with the IAM 250. These multiple devices are not shown for ease of illustration. A configuration file for the IAM 250 may point to the library of modules. Alternatively, the configuration file may include selection logic that reads the library of modules, selects a particular directory service and a particular authentication service as well as identify their locations, and determine the appropriate communication protocol to use for communicating with the selected directory service and the selected authentication service.

If the IAM 250 receives from the directory service 152 an indication indicating the given user requesting login to the device 210 does not exist for the device 210, then the IAM 250 may prepare a response to send to the device 210. The response may include an indication indicating the given user does not exist for the device 210. The IAM 250 may not collect any user role information and user privileges and permissions information for the given user. This information may be stored on the server 150 and accessed by the directory service 152.

If the IAM 250 receives from the directory service 152 an indication indicating the given user requesting login to the device 210 does exist for the device 210, then the IAM 250 determines to access the authentication service 162 hosted on the server 160. One or more of a configuration file, a library of modules and selection logic may be used to perform this determination. The request to determine whether the given user is an authenticated user of the device 210 is sent from the IAM 250 to the authentication service 162 on the server 160 using a communication protocol such as LDAP or other. The request includes at least an encrypted version of the password provided by the given user. In some cases, a separate directory service is not used as the device 210 is used within a relatively small business environment. For example, ten or less devices may be used within the small business environment and access the IAM 250. The IAM 250 may determine whether a given user exists for a particular device within the small business environment, rather than use a separate directory service to perform this determination.

The authentication service 162 sends a response to the IAM 250 after determining whether the given user is an authenticated user for the device 210. The IAM 250 prepares a response to send to the device 210. The response includes an indication indicating whether the given user is an authenticated user of the device 210. If the indication indicates the given user is an authorized user of the device 210, then the IAM 250 may retrieve any user role information and user privileges and permissions information for the given user. This information may be stored on the server 150 and accessed by the directory service 152, and could be returned in response to the user directory lookup. Alternatively, this information may be stored on the server 160 and accessed by the authentication service 162. Further, this information may be stored elsewhere, but the IAM 250 is able to determine the location of this information. The IAM 250 retrieves this information by sending a request identifying at least the given user and using any appropriate communication protocol for the destination location.

When the IAM 250 sends the response to the device 210, the previous communication protocol, such as LDAP, used for one or more of the directory service 152 and the authentication service 162 may be unnecessary and unused. In response to receiving an indication indicating the given user both exists for the device 210 and the given user is authorized for the device 210, the device 210 may create a login session for the given user using the user role information and user privileges and permissions information. The operating system 120 for the device 210 may perform these steps. In addition, the data structure created by the NSS 242 for the virtual user may have its fields updated or modified with information corresponding to the given user in order to transform the virtual user into the given user. Alternatively, the virtual user information may be discarded and replaced by the given user. As described earlier, this information may include as a user identifier (ID), a group ID, a username, a user home directory, a default shell type, and so forth.

Figure 3:
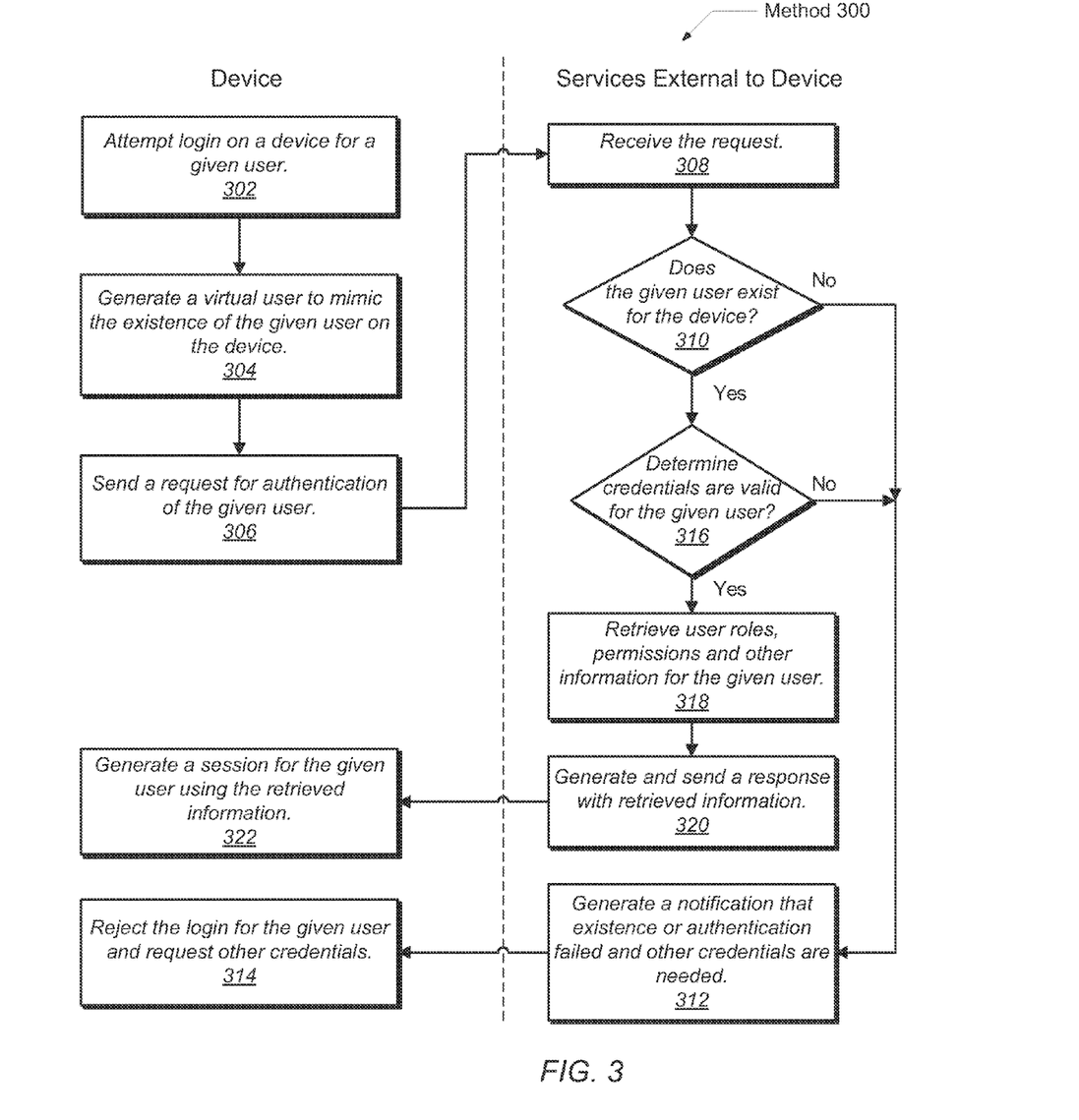
FIG. 3 is a flow diagram illustrating one embodiment of a method for creating a login session for a user on a device.

Referring now to FIG. 3, an embodiment of a method 300 for creating a login session for a user on a device is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 302, a given user attempts a login on a device. In some embodiments, the device is a storage appliance. The device may be deployed with multiple other devices in either a small business environment or an enterprise environment. In block 304, a virtual user may be generated to mimic the existence of the given user on the device. For example, a data structure with multiple fields may be created. The fields may store information such as a user identifier (ID), a group ID, a username, a user home directory, a default shell type, and so forth. A particular field may also indicate whether the user exists for the device. Although one or more of these fields are unfilled, an indication may be set indicating the user exists for the device although no verification has yet been performed.

In block 306, a request for authentication for the given user is sent. The request may not use a predetermined communication protocol for authentication services, such as LDAP or other. In block 308, services external to the device receive the request. Verification of the existence of the given user for the device is performed. In some embodiments, logic within a component or unit, such as the IAM 250 described earlier, performs the verification. In other embodiments, a separate directory service, such as the directory service 152 described earlier, is used to perform the verification. In either case, the device may not be configured for a particular directory service and communication protocol for the particular directory service.

If it is determined the given user does not exist for the device (conditional block 310), then in block 312, a notification is generated that the given user does not exist and other credentials are needed. In block 314, in response to the notification, the login for the given user is rejected. A request for other credentials may be generated and provided. If it is determined the given user does exist for the device (conditional block 310), then it is determined whether the credentials for the given user are valid. For example, a password provided by the given user during the login request may be compared to a stored password for the given user.

Communication used for the authentication may use an encrypted version of the password. The authentication process may use an authentication service hosted on a particular server. A communication protocol corresponding to the authentication service is used to send and receive transactions to and from the server. The device, however, may be unaware of the communication protocol and have no configuration information stored regarding the communication protocol.

If the credentials, such as at least a password, for the given user are invalid and the given user is not authenticated for the device (conditional block 316), then control flow for the method 300 moves to block 312. Otherwise, in block 318, user role information and user permissions and privileges and other configuration information for the given user is retrieved. The device may not store any of this information, but receives the retrieved information to store during a corresponding login session for the given user. When the login session ends, the retrieved configuration information for the give user may be removed.

In block 320, a response is generated and sent to the device. The response includes an indication that the given user exists for the device and the given user is authenticated to use the device. The response may also include the retrieved configuration information corresponding to the given user. In block 322, the device generates a login session for the given user based on at least the retrieved configuration information. As described earlier, when the login session ends, the retrieved configuration information is no longer stored. During any subsequent login session for the given user the above steps are repeated and the corresponding configuration information is retrieved again.

Figure 4:
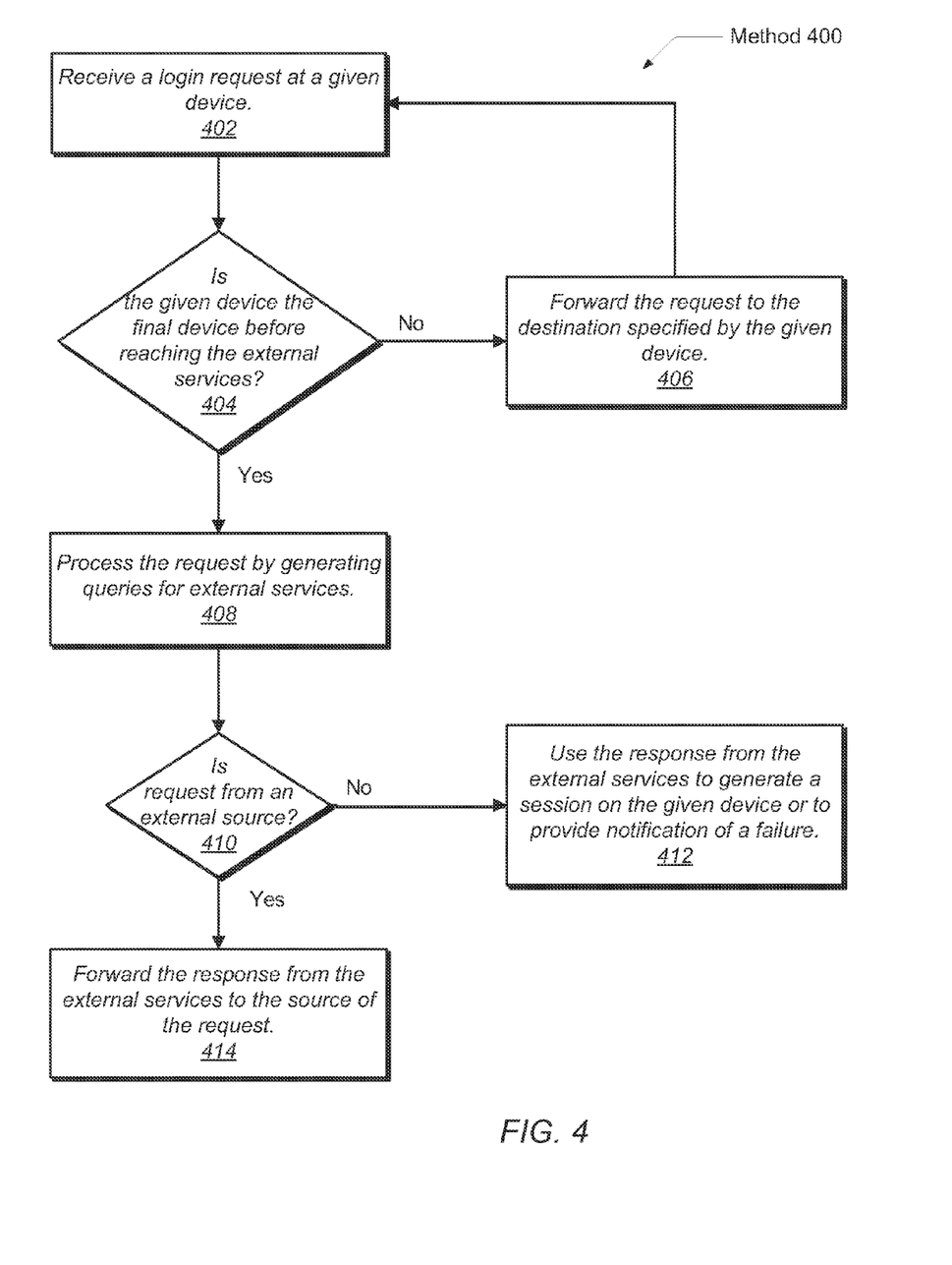
FIG. 4 is a flow diagram illustrating one embodiment of a method for login request and response traffic in a network of deployed devices.

Referring now to FIG. 4, an embodiment of a method 400 for creating a login session for a user on a device is shown. For purposes of discussion, the steps in this embodiment are shown in sequential order. However, some steps may occur in a different order than shown, some steps may be performed concurrently, some steps may be combined with other steps, and some steps may be absent in another embodiment.

Multiple devices are deployed in a small business environment or in a larger enterprise environment. In various embodiments, the deployed devices are storage appliances. The devices may not store any configuration information for users, such as user role information, user permissions and privileges and other information. In addition, the deployed devices may not be configured for any communication protocol for directory services and authentication services.

In block 402, a given device of the deployed devices receives a login request. If the given device is not the final device before reaching external services to handle the login request (conditional block 404), then in block 406, the request is forwarded to the destination specified by the given device. For example, another deployed device may be indicated as the destination. This other device may not actually be the final device before reaching external services to handle the login request. If not, then forwarding of the login request continues. If the given device is the final device before reaching external services to handle the login request (conditional block 404), then in block 408, the login request is processed through one or more generated queries to the external services. For example, a directory service and an authentication service may be used as described earlier. During the processing, an identity and access manager (IAM) may be used to generate the queries and process responses from the directory service and the authentication service. When the processing is completed, the IAM sends a corresponding response to the given device.

If the login request originated from the given device, then no external source generated the login request. If this is the case (conditional block 410), then in block 412, the response with information from the external services is used to generate a login session on the given device responsive to the response indicates the login request is granted. Otherwise, the given device generates and provides a notification of failure to a corresponding user.

If the login request originated from another device other than the given device and the login request was forwarded to the given device, then an external source generated the login request. If this is the case (conditional block 410), then in block 414, the given device forwards the response with information from the external services to the device that sent the login request to the given device. This other device may not be the device that originally received the login request from the corresponding user. In such a case, this other device also forwards the response to another device until the actual source device where the login request originated receives the response with the information from the external services.

Figure 5:
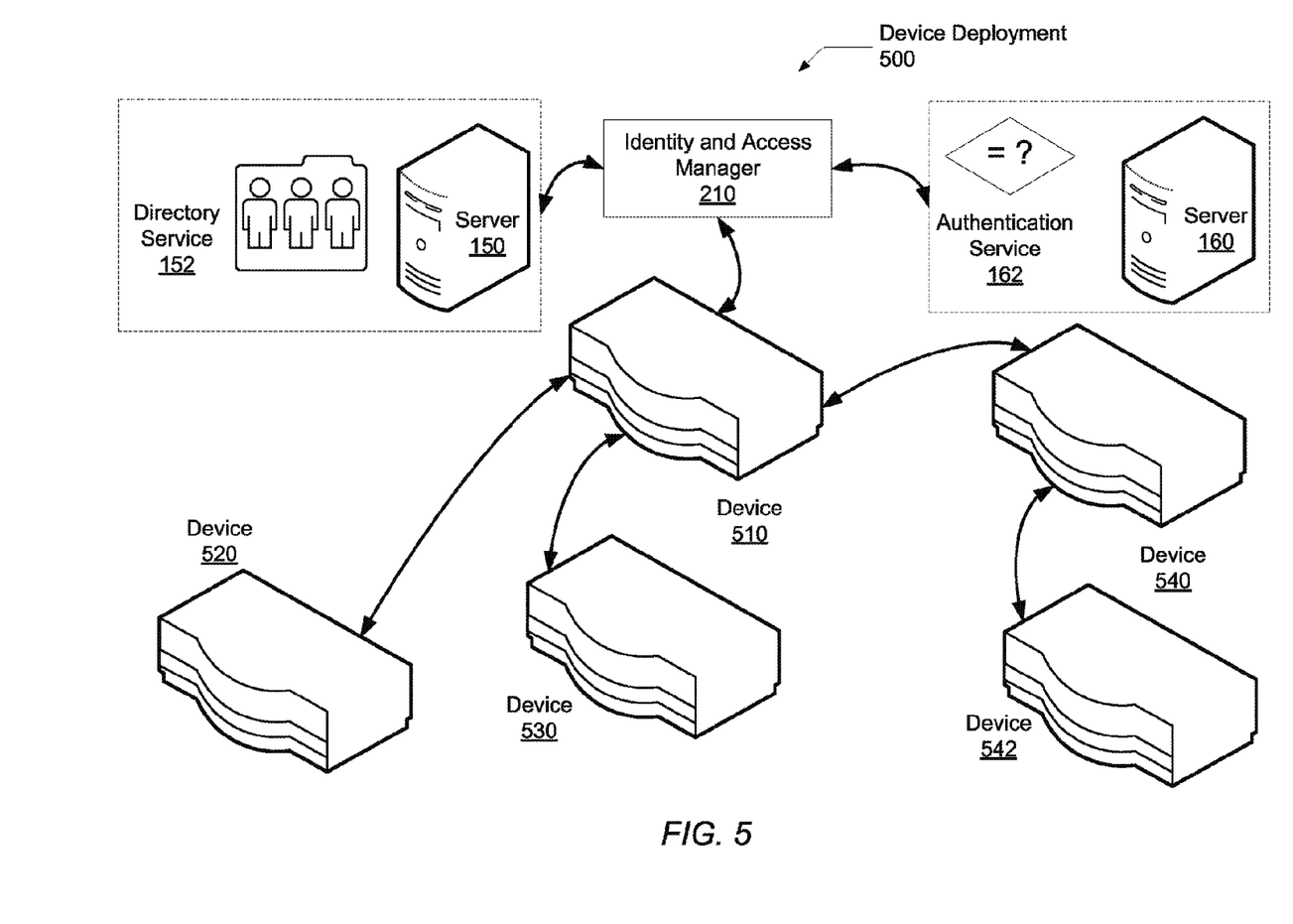
FIG. 5 is a generalized block diagram illustrating one embodiment of device deployment.

Referring now to FIG. 5, a generalized block diagram of one embodiment of device deployment 500 is shown. Circuitry and logic described earlier are numbered identically. In various embodiments, the devices 510-542 may be purpose-built backup appliances (PBBAs) similar to the device 210 described earlier. The PBBA may also be referred to as a storage appliance. Although five devices are shown in the deployment 500, other numbers of devices used for the deployment are possible and contemplated.

One or more of the devices 510-542 may not store any user configuration information such as user role information, user permissions and privileges information and other user configuration information. In addition, one or more of the devices 510-542 may not store any configuration information for a communication protocol used to communicate with one or more of the directory service 152 and the authentication service 162.

As shown, the device 510 is the only device connected to the IAM 250. The IAM 250 may be used for verification purposes as described earlier. As described earlier, the connections to the servers 150 and 160 and connections between the devices 510-542 may include a variety of techniques including wireless connection, direct local area network (LAN) connections, wide area network (WAN) connections such as the Internet, a router, remote direct memory access (RDMA) hardware and/or software, transmission control protocol/internet protocol (TCP/IP) hardware and/or software, repeaters, switches, grids, and/or others. Each of the devices 510-542 and the servers 150 and 160 may be located onsite, may be located at a remote site or branch office, or may be cloud-based.

Each of the devices 520, 530 and 540 is shown connected to the device 510. These connections may indicate the devices 520-540 store an indication that the device 510 is a destination for requests to process received login requests from a user. For example, when the device 520 receives a login request from a given user to create a session on the device 520, the device 520 generates a request to send to the device 510. This generated request requests whether the given user exists for the device 520 and whether the credentials provided in the login request indicate the given user is an authenticated user for the device 520. The device 510 communicates with the IAM 250 as described earlier to process the request from the device 520. Similar steps are used for login requests on the device 530 and on the device 540.

When the device 542 receives a login request from a given user to create a session on the device 542, the device 542 generates a request to send to the device 540. This generated request requests whether the given user exists for the device 542 and whether the credentials provided in the login request indicate the given user is an authenticated user for the device 542. The device 540 receives the request from the device 542, determines itself is not the final destination for the request, further determines the device 510 is the destination for the received request, and forwards the request to the device 510. The device 510 communicates with the IAM 250 as described earlier to process the request from the device 542. A response with information from the services 152 and 162 is routed from the device 510 to the device 540 and from the device 540 to the device 542.

Figure 6:
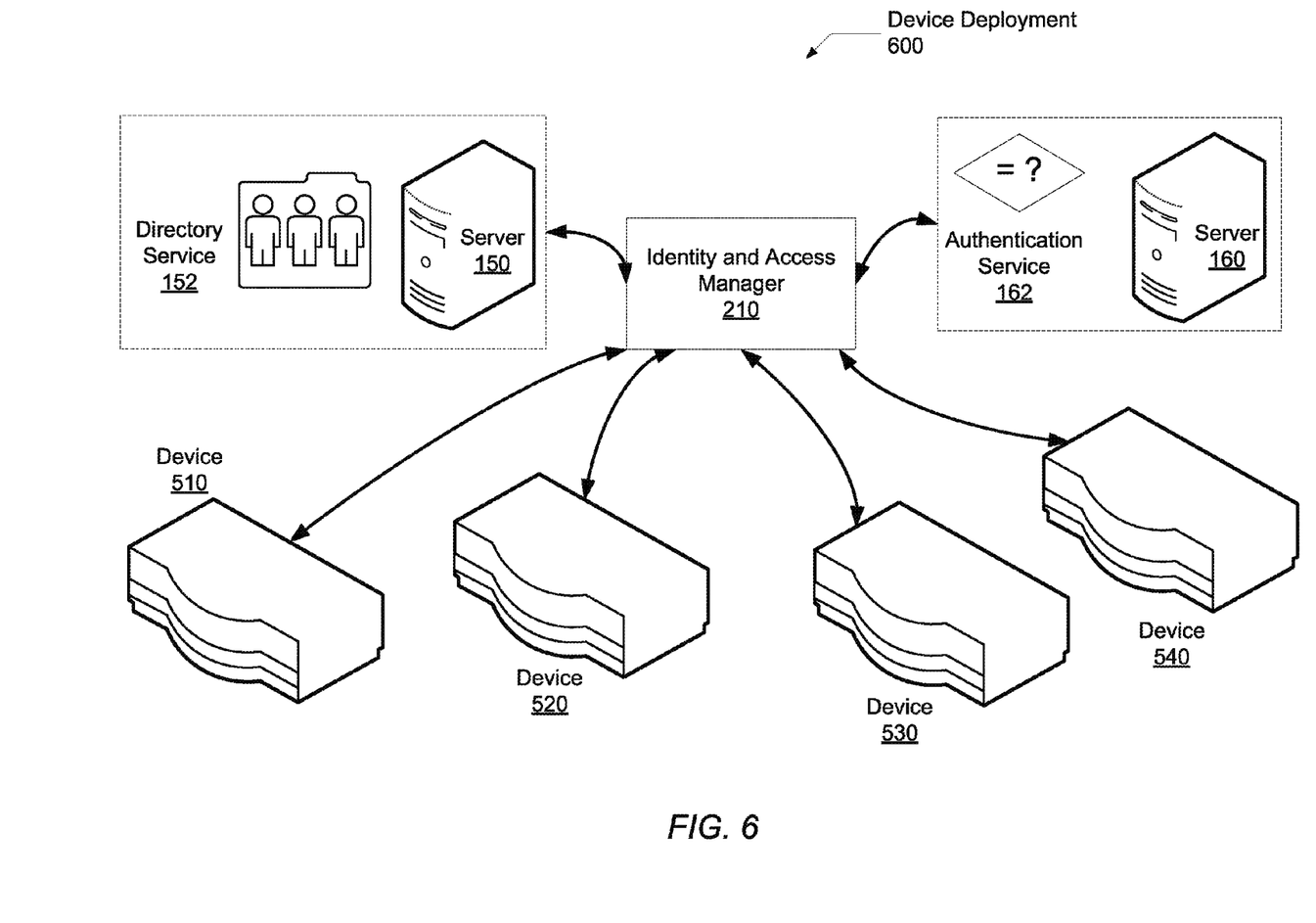
FIG. 6 is a generalized block diagram illustrating another embodiment of device deployment.

Referring now to FIG. 6, a generalized block diagram of another embodiment of device deployment 600 is shown. Circuitry and logic described earlier are numbered identically. As shown, each of the devices 510-540 is connected to the IAM 250. The IAM 250 may be used for verification purposes as described earlier. These connections may indicate the devices 510-540 store an indication that the IAM 250 is a destination for requests to process received login requests from a user. The devices 510-540 communicate with the IAM 250 as described earlier to process requests for authenticating received login requests. A corresponding response with information from the services 152 and 162 is routed from the IAM 250 to the corresponding one of the devices 510-540.

Figure 7:
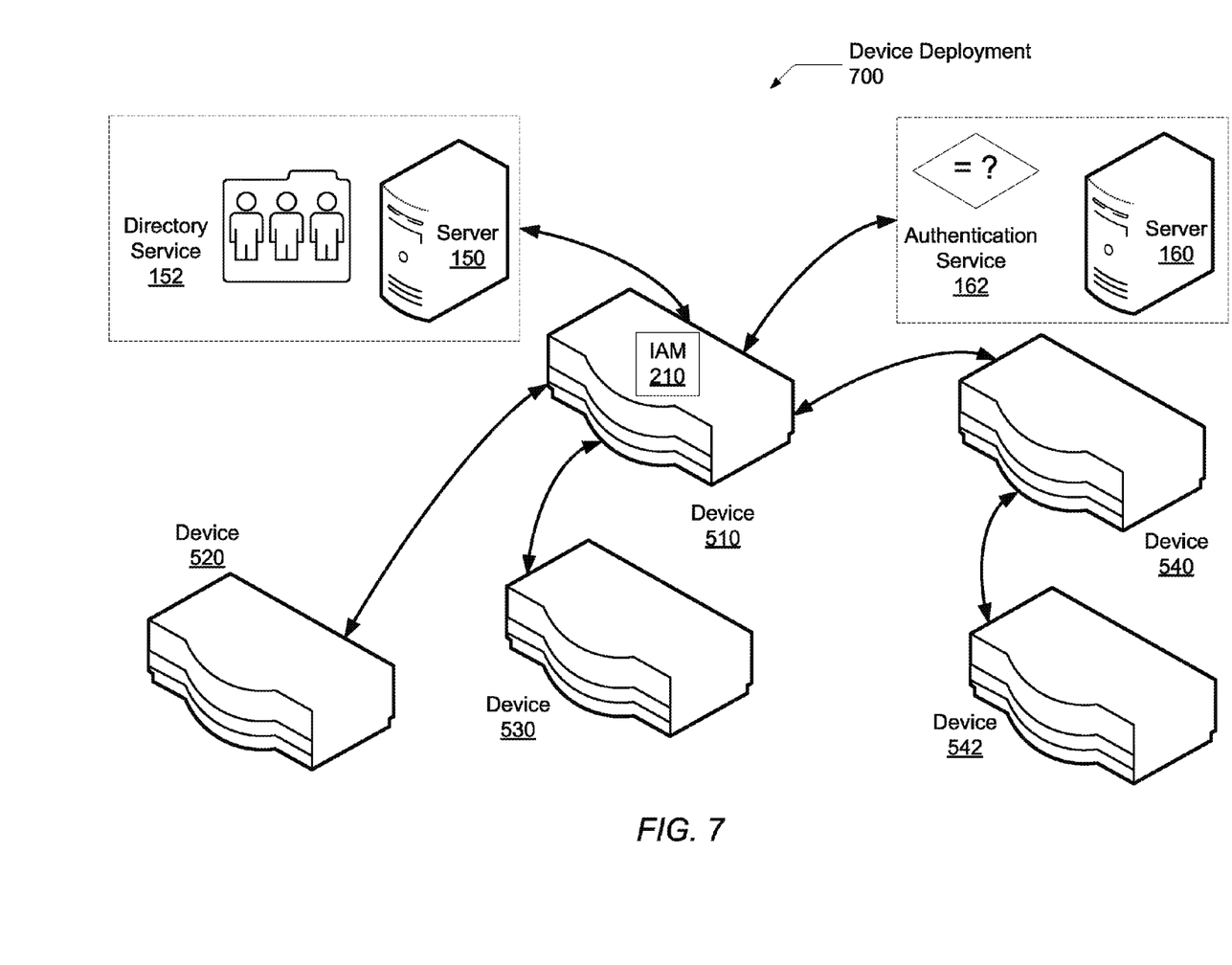
FIG. 7 is a generalized block diagram illustrating yet another embodiment of device deployment.

Referring now to FIG. 7, a generalized block diagram of yet another embodiment of device deployment 700 is shown. Circuitry and logic described earlier are numbered identically. As shown, the device 510 includes the IAM 250. The IAM 250 may be used for verification purposes as described earlier. Each of the devices 520-540 is connected to the device 510. These connections may indicate the devices 520-540 store an indication that the device 510 is a destination for requests to process received login requests from a user. The devices 520-540 communicate with the device 510, which communicates with the IAM 250, as described earlier to process requests for authenticating received login requests. A corresponding response with information from the services 152 and 162 is routed from the servers 150 and 160 to the IAM 250 within the device 510 and then to the corresponding one of the devices 520-540. Forwarding requests and responses for the device 542 uses the device 540 as described earlier.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
  a plurality of devices including a first device comprising at least one of circuitry and program code; and
  an identity and access manager (IAM);
  wherein in response to the first device receiving a first request from a given user to login to the first device, the first device is configured to:
    generate a virtual user to mimic an existence of the given user on the first device, prior to verifying the existence of the given user on the first device; and
    send a second request corresponding to the given user to the IAM, wherein the second request comprises a request for verification of both the existence of the given user for the first device and an authorization of use by the given user for the first device;
  wherein in response to receiving from the IAM an indication that the given user is an authorized user of the first device, the first device is configured to create a session for the given user with privileges determined by user role information received from the IAM, wherein creating the session for the given user comprises updating or replacing information associated with the virtual user in order to transform the virtual user into the given user.

2. The computing system as recited in claim 1, wherein the IAM comprises at least one of circuitry and program code, the system further comprising:
  a user directory service configured to store user identification information for one or more users; and
  an authentication service configured to store user credential information for the one or more users;
  wherein in response to receiving the second request from the first device, the IAM is configured to:
    send a first query to the user directory service to verify an existence of the given user; and
    in response to receiving an indication from the user directory service indicating the existence of the given user, send a second query to the authentication service to verify whether the given user is an authorized user for the first device.

3. The computing system as recited in claim 2, wherein in response to receiving an indication from the authentication service indicating the given user is an authorized user for the first device, the IAM is further configured to send a response to the first device, wherein the response comprises user role information and an indication that the given user is the authorized user for the first device.

4. The computing system as recited in claim 1, wherein the first device of the plurality of devices is a storage appliance and the first device has not been configured for use by the given user.

5. The computing system as recited in claim 1, wherein the first device is a storage appliance, and wherein the second request is conveyed to a second device that is a storage appliance, and in response to the second device receiving the second request from the first device, the second device is configured to forward the second request to a third device that includes the IAM.

6. A device comprising:
a name switch service (NSS) module comprising at least one of circuitry and program code; and
a pluggable authentication management (PAM) module comprising at least one of circuitry and program code;
wherein in response to receiving a first request from a given user to login to the device, the NSS module is configured to generate a virtual user to mimic an existence of the given user on the device prior to verifying the existence of the given user for the device; and
wherein in response to receiving an indication from the NSS indicating said existence, the PAM module is configured to convey a second request corresponding to the given user, wherein the second request comprises a request for verification of both the existence of the given user and an authorization of use by the given user for the device;
wherein in response to receiving an indication indicating the given user is an authorized user of the first device, the device is configured to create a session for the given user by updating or replacing information associated with the virtual user in order to transform the virtual user into the given user.

7. The device as recited in claim 6, wherein to update the virtual user to be the given user on the device, the NSS module is further configured to update a data structure corresponding to the given user with received information comprising at least one of a user identifier (ID), a group ID, and a home directory for the given user.

8. The device as recited in claim 6, wherein when the first request is received, the device has not been configured for use by the given user.

9. The device as recited in claim 6, wherein the device is a storage appliance, and wherein the second request is conveyed to a second device that is a storage appliance.

10. The device as recited in claim 6, wherein the device is configured to be used as part of a hierarchy of storage appliances.

11. A method for executing on a processor, the method comprising:
receiving a first request at a first device from a given user to login to the first device;
generating a virtual user to mimic an existence of the given user on the first device, prior to verifying the existence of the given user on the first device; and
sending a second request corresponding to the given user to an identity and access manager (IAM), wherein the second request comprises a request for verification of both the existence of the given user for the first device and an authorization of use by the given user for the first device;
wherein in response to receiving from the IAM an indication that the given user is an authorized user of the first device, the first device is configured to create a session for the given user with privileges determined by user role information received from the IAM, wherein creating the session for the given user comprises updating or replacing information associated with the virtual user in order to transform the virtual user into the given user.

12. The method as recited in claim 11, wherein in response to receiving the second request, the method further comprises:
sending a first query to a user directory service to verify an existence of the given user, wherein the user directory service stores at least user identification information for one or more users; and
in response to receiving an indication from the user directory service indicating the existence of the given user, sending a second query to an authentication service to verify whether the given user is an authorized user for the first device.

13. The method as recited in claim 12, wherein in response to receiving an indication from the authentication service indicating the given user is an authorized user for the first device, the method further comprises the IAM sending a response to the first device, wherein the response comprises user role information and an indication as to whether the given user is the authorized user for the first device.

14. The method as recited in claim 11, wherein the first device of the plurality of devices is a storage appliance and the first device has not been configured for use by the given user.

15. The method as recited in claim 11, wherein the first device is a storage appliance, and wherein the second request is conveyed to a second device that is a storage appliance, and in response to the second device receiving the second request from the first device, the second device is configured to forward the second request to a third device that includes the IAM.

* * * * *